Jan. 15, 1929.
M. J. KELLY
1,699,396
ICE BOX PAN
Filed Feb. 5, 1927
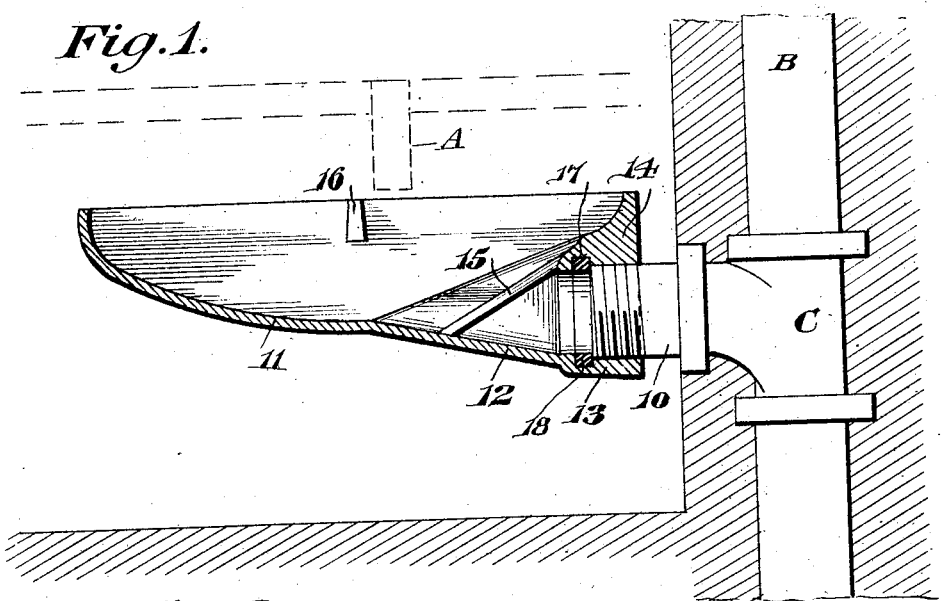
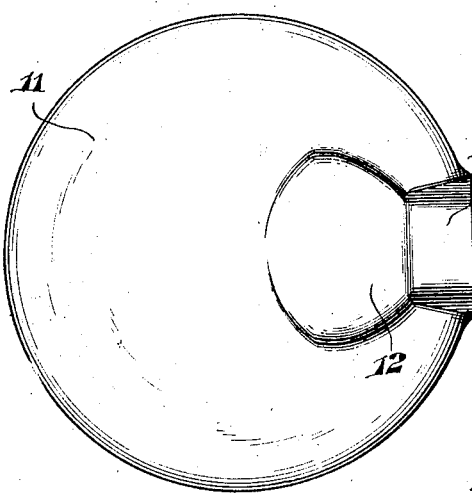
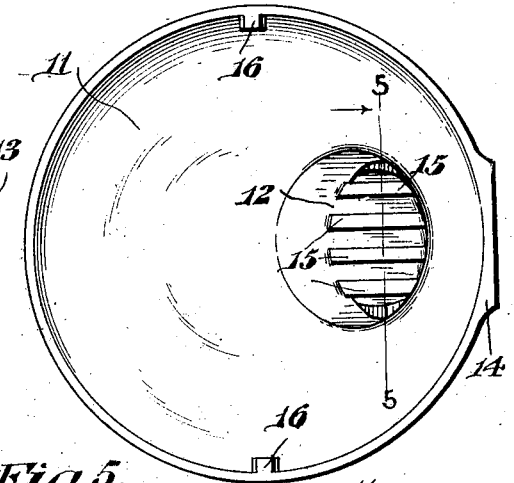
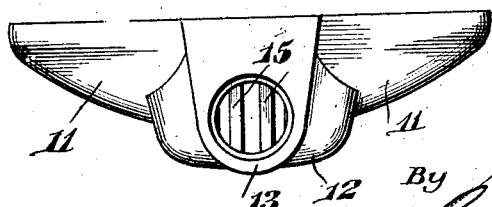
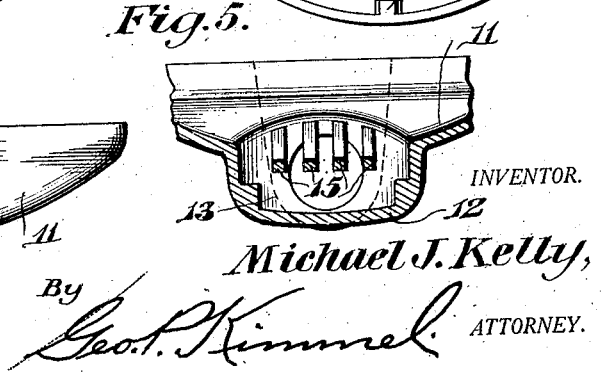
INVENTOR.
Michael J. Kelly,
By Geo. F. Kimmel
ATTORNEY.

Patented Jan. 15, 1929.

1,699,396

UNITED STATES PATENT OFFICE.

MICHAEL J. KELLY, OF HILTON, NEW JERSEY, ASSIGNOR TO HOPE FOUNDRY & MACHINE CO., INC., OF HILTON, NEW JERSEY, A CORPORATION OF NEW JERSEY.

ICE-BOX PAN.

Application filed February 5, 1927. Serial No. 166,217.

The invention relates to a pan construction, and more especially to drip pans for use in connection with refrigerators.

The primary object of the invention is the provision of a pan of this character, wherein the outlet for conveying the drippings from the refrigerator to a drain pipe is of novel form and will prevent the possibility of the choking or stopping up of said drain pipe, resultant from sediment and foreign matter accumulating or massing in the outlet opening.

Another object of the invention is the provision of a pan of this character, wherein the construction thereof possesses peculiarities, rendering it capable of being permanently mounted beneath a refrigerator, so that the drippings therefrom will be constantly carried off to a drain pipe of the permanent system within a house or other enclosure, thus relieving constant attention to the ordinary pan which requires emptying at intervals of time, the drippings being automatically taken care of.

A further object of the invention is the provision of a pan of this character, wherein it connects with a drain pipe, will be rendered leak-proof, the pan in its entirety being of novel form.

A still further object of the invention is the provision of a pan of this character, which is extremely simple in its construction, thoroughly reliable and efficient in its purpose, unitary in its formation, strong, durable, and inexpensive to manufacture and install.

With these and other objects in view, the invention consists in the features of construction, combination and arrangement of parts, as will be hereinafter more fully described, illustrated in the accompanying drawing, and pointed out in the claims hereunto appended.

In the accompanying drawing:—

Figure 1 is a vertical sectional view through a drip pan constructed in accordance with the invention, showing the same applied to a drain pipe, the latter being shown in elevation, while the portion of the refrigerator being illustrated by dotted lines disclosing its relative position to the pan.

Figure 2 is a bottom plan view of the pan detached from the drain pipe.

Figure 3 is an end elevation thereof.

Figure 4 is a top plan view of the drip pan.

Figure 5 is a fragmentary sectional view on the line 5—5 of Figure 4 looking in the direction of the arrows.

Similar reference characters indicate corresponding parts throughout the several views in the drawing.

Referring to the drawing in detail A designates generally the drip tube of a refrigerator and B a drain pipe, which is a part of the plumbing system permanently built within an enclosure, the latter having a T-joint C from which leads an externally threaded nipple 10 at the desired height from the foundation of the enclosure within a room and to which is adapted to be attached the drip pan constituting the present invention and hereinafter more fully described.

The drip pan comprises an open top bowl-like body referred to generally at 11, of substantially semi-oval cross section and preferably of circular contour in plan. The body 11 is cast or otherwise formed, preferably made from metal, although it can be constructed of any suitable material. The body 11 includes a top portion 19 and a bottom portion 20. The bottom portion 20, at a point between the axis thereof and the rear side of the top portion 19 is formed with a horizontally disposed oval-shaped opening 21 positioned adjacent the horizontal median and intersected centrally by the transverse median of the body 11.

Formed integral with the outer face of the rear side of the top portion 19 and with the lower face of the bottom portion 20 of the body 11, intersected centrally by the transverse median of the latter, extending to and projecting beyond the outer side wall of the opening 21, is a vertically disposed extension 14, which projects laterally from the top and bottom portions 19, 20 and also depends a substantial distance below the lowest part of said bottom portion. That part of the extension which projects beyond the outer side wall of the opening 21 is indicated at 22. The extension 14 has a rounded lower end 13 and gradually increases in width from the latter to its upper end. The sides of the extension 14 are inwardly beveled from the rear face of the extension toward the bottom portion 20. The rear face of the extension 14 is squared throughout.

Formed integral with the bottom portion 20 and extension 14, is a depending web 12 of U-shaped cross section. The web 12 merges into the forward side wall and the end walls of the opening 21, into the extension 14 at the sides thereof and also into the forward face of the latter above the bottom thereof. The web 12 gradually increases in height from the inner side wall of the opening 21 to the extension 14 whereby the bottom of the web will incline downwardly from its inner end towards the lower end of the extension 14.

The extension 14 is provided with a transverse opening 17 having the wall thereof formed of different diameters as indicated at 17', 17'' and 17'''. That part 17' is of the greatest diameter. That part 17'' is of the smallest diameter, and that part 17''' is of slightly greater diameter than the part 17'', and threaded. The part 17''' is of greater length than the parts 17' and 17''. The providing of the wall of the opening 17 of three different diameters forms an annular groove between the parts 17'' and 17''', in which is seated a compressible packing member 18 in the form of an annulus having its inner diameter corresponding to the diameter of and flush with said part 17''. The packing member 18 projects beyond the portion 17''' of the wall and provides an abutment for a purpose to be presently referred to.

Formed integral with the top of the part 22 of the extension 14, and also formed integral with the upper face of the bottom of the web 12, at a point between the transverse median of the latter and its inner end, is a guard in the form of a grill consisting of spaced bars 15 extending at an upward inclination throughout from the web 12 to the extension 14. The bars 15 are reversely inclined with respect to the bottom of the web 12.

The web 12, in connection with the extension 14 provides a discharge receiving pocket depending from the bottom of and opening into said body 11 and provided with a guard constituted by the grill. The outlet for the pocket is provided by the opening 17 formed in the extension 14, and the said opening 17 is disposed transversely with respect to the body 11.

The threaded part 17''' of the wall of the opening 17 is adapted to receive the nipple 10, the latter being peripherally threaded for connection to the part 17'''. When the nipple 10 is connected to the extension 14, the free end of the former engages the packing member 18 and compresses it to provide a fluid tight joint. The nipple 10 supports the pan in position and in this connection see Figure 1.

In the mounting of the body 11 upon the nipple 10 the pan is extended into the room or other enclosure where the refrigerator may be located so that its drain tube A will be superposed relative to the body 11 so that the latter will catch all drippings from the refrigerator and such drippings be conveyed from the body 11 into the drain pipe B as will be obvious. It is also a fact that by reason of the squared rear face of the extension 14 the pan can abut the wall having the drain pipe B therein and in this manner such pan can be braced and held rigid.

Formed interiorly of the body 11 of the pan at diametrically opposite points are lugs 16, which enable a gripping of the pan for the manipulation thereof when setting the same.

By reason of the formation of the body 11 and its outlet 12 there is no possibility of sediment collecting within the pan as all sediment and foreign matter will be gravitated into the trap as will be clearly obvious.

As understood the pan is located immediately beneath the drain tube A of the refrigerator so that all drippings therefrom will fall into the pan and be caught therein to be subsequently dissipated into the drain pipe B.

From the foregoing it is thought that the construction and manner of operation of the device will be clearly understood and therefore a more extended explanation has been omitted.

What is claimed is:—

1. In an ice box pan, a bowl-like body having a concave bottom, means formed integral with said body and depending therefrom to provide a pocket below said bottom, said bottom being formed with an opening leading into said pocket, an outlet from said pocket, and a grill disposed within the pocket and lying wholly below said bottom to span said outlet.

2. In an ice box pan, a bowl-like body formed with a concave bottom and further formed with a vertically disposed extension projecting laterally from the body at the rear side thereof and depending below the horizontal plane of the lowermost portion of said bottom, a web formed integral with said bottom and extension and depending from the bottom to provide a pocket therebelow, said bottom being formed with an opening leading into said pocket, said extension being formed with an opening to provide an outlet for said pocket, and a grill disposed within the pocket, lying wholly below said bottom, and extending from the bottom portion of the web to said extension to span said outlet.

In testimony whereof, I affix my signature hereto.

MICHAEL J. KELLY.